United States Patent [19]

Helbers et al.

[11] Patent Number: 4,885,743
[45] Date of Patent: Dec. 5, 1989

[54] METHOD AND APPARATUS FOR DETECTING THE COLLISION OF DATA PACKETS

[75] Inventors: Jan Helbers, Rochester; Frederick W. Scholl, Riverdale; Michael H. Coden, Bronx, all of N.Y.

[73] Assignee: Codenoll Technology Corporation, Yonkers, N.Y.

[21] Appl. No.: 157,545

[22] Filed: Feb. 18, 1988

[51] Int. Cl.[4] .............................................. H04J 3/26
[52] U.S. Cl. ................................. 370/85.2; 370/94.1; 340/825.5
[58] Field of Search .................. 370/94, 85; 340/825.5

[56] References Cited

U.S. PATENT DOCUMENTS

| | | | |
|---|---|---|---|
| 4,063,220 | 12/1977 | Metcalfe et al. | 370/85 |
| 4,282,512 | 8/1981 | Boggs et al. | 340/825.5 |
| 4,560,984 | 12/1985 | Scholl | 375/113 |
| 4,561,091 | 12/1985 | Scholl et al. | 455/607 |
| 4,578,799 | 3/1986 | Scholl et al. | 375/87 |
| 4,596,011 | 6/1986 | Kobayashi et al. | 370/94 |
| 4,701,909 | 10/1987 | Kavehrad et al. | 370/94 |

Primary Examiner—Douglas W. Olms
Assistant Examiner—Melvin Marcelo
Attorney, Agent, or Firm—Pennie & Edmonds

[57] ABSTRACT

Through the method and apparatus of the present invention the collision of two packets can be detected under a variety of conditions. The preamble of each packet transmitted is modified to include collision detection data comprising an initial pulse having an amplitude sufficiently high to be detected even when attenuated and having a pulse width twice the normal data pulse width followed by a randomly generated code of a predetermined length in which a predetermined number of pulses of the code are at a high binary data signal level. Thus, in the event two packets collide, the collision may be detected by detecting a second large pulse within a time period less than the sum of the packet duration and the gap, by determining if a large initial pulse has a pulse width larger than the generated pulse width, by determining if a subsequent large pulse occurs within the remainder of the packet and by determining if more than the predetermined number of pulses of the code have a high binary data level.

9 Claims, 5 Drawing Sheets

METHOD AND APPARATUS FOR DETECTING THE COLLISION OF DATA PACKETS

RELATED PATENT

A related patent is U.S. Pat. No. 4,560,984 which is herein incorporated by reference.

BACKGROUND OF THE INVENTION

The present invention relates to a method and apparatus for detecting when a collision occurs between two or more binary data signal packets when they are received by a single binary data signal receiver.

Computers are widely used for computation, data processing, control and communication systems. Frequently, access to a computer is made by way of remote consoles or terminals each tying into the computer. The communications link between the terminals and the computer is advantageously established by using optical fibers because of their known properties of high signal speed, structural simplicity, low distortion, and isolation from interference.

Computer communications are characteristically in the form of short bursts of binary information. By taking advantage of the characteristics of computer communications, systems have been developed which allow many users to use a single computer at the time and for different computers to communicate with one another over a single network.

Two switching techniques are generally used in computer communication systems to permit non-exclusive use of a computer. These switching techniques are known as the circuit switching technique and the packet switching technique. Data communications over the switched public telephone line are illustrative of the circuit switching technique, and the Ethernet system is typical of the packet switching technique.

The circuit switching technique establishes a connection between a computer and a terminal only when data is to be transmitted. However, because the time required to establish a connection may be very large compared to the actual time of a communication, especially in the case of a short communication, this technique is slow, inefficient and expensive.

In contrast, the packet switching technique maintains the communications connection but transmits the data in the form of packets of binary information. Short communications are transmitted by a single packet while longer or bursty communications are transmitted by a series of packets. The packets are of a duration of about 60 microseconds, and if a communication cannot completely fit onto a single packet, more than one packet is transmitted separated by a gap of about 10 microseconds in duration. Data rates in the Ethernet system, for example, are 10 Megabits/second so that a single bit has a pulse width or duration of 100 nanoseconds and a packet contains about 6,000 bits.

The packet is typically divided into two primary sections, the header and the data, each of which has a different purpose. The header is the portion of the packet which is initially received and contains such information as the address to which the packet is to be sent, the address of the sender of the packet and other information that the particular system requires. Following the header is the data section in which the substance of the communication is contained either wholly for a short communication, or partially for a longer communication. The packet may include an additional section which follows the data section which contains information relating to error checks or to packet linking.

Because packets are transmitted from different transmitters at random time intervals, it is possible that packet collisions will occur because more than one packet is transmitted at the same time. When a collision of packets is detected, an instruction is sent to retransmit the original data so that another attempt may be made to receive the packet without a collision. If a collision of packets is not detected, the information transmitted is lost since the signal received is unintelligible as it is a sum of the overlapping packets.

Numerous techniques are known in the art for detecting a data collision. Ordinarily, these techniques are implemented at each terminal that is transmitting a data packet. In U.S. Pat. No. 4,063,220, an exclusive OR gate at a signal transmitter compares the transmitted signal with the signal present on the communication cable and aborts transmission when they are not the same. Another technique is to monitor the DC level of the signal received from the communication line and, if this level is higher than a specified threshold, assume there is a data collision. Alternatively, as disclosed, for example, in U.S. Pat. No. 4,282,512, the receiver can look for data transitions that occur at timings different from those expected for the received data.

U.S. Pat. No. 4,561,091 discloses a data communications receiver with a collision detection circuit for comparing a signal from a timing circuit with the received data signal and for producing a collision detection signal when the received data signal fails to change within the duration of the output signal from the timing circuit. The duration of the output signal from the timing circuit is equal to the longest data signal interval.

U.S. Pat. No. 4,560,984 discloses a method for detecting the collision of data packets in which a signal pulse, having an amplitude much larger than a data pulse, is substituted for the initial bit of the packet. The receiver tests for a pulse much larger than a data pulse. If two large signal pulses are received within a time period less than or equal to the sum of the duration of the packet and the time period between packets, a collision has occurred.

However, the above methods do not detect collisions for certain conditions. For example, the above methods do not detect the collision of two signals which arrive at the receiver at approximately the same time. In addition, the above methods do not always detect collisions that may arise involving an attenuated signal. In optical communication systems, it has been found that up to a 7db loss (i.e. 80% decrease) of optical power may occur between the signal transmitted and the signal received. This loss of power may arise due to the length of transmission and the connectors or repeaters the signal passes through. In some cases of collision, the amplitude difference between the attenuated signal and the non-attenuated signal is so great that the attenuated signal has little effect on the non-attenuated signal and the collision is undetectable by current collision detection techniques.

SUMMARY OF THE INVENTION

Through the method and apparatus of the present invention the collision of two packets can be detected under a variety of conditions. Whenever a packet is transmitted in a preferred embodiment of an invention, the first twenty-four bits of the packet are modified to include collision detection data comprising an initial pulse having an amplitude sufficiently high to be detected even when attenuated and having a pulse width twice the normal data pulse width followed by a twenty bit code randomly generated at bit cell locations 5-24 in which ten pulses out of the twenty are at a high binary data signal level.

In the event two packets collide, the collision may be detected as in the '984 patent by detecting a second large pulse within a time period less than the sum of the packet duration and the gap. If, however, the two packets arrive at nearly the same time and are not detectable by the methods of the '984 patent, it is highly unlikely that the two packets will arrive at exactly the same time or have the same, twenty bit randomly generated codes. Thus, a collision is detected by determining if a large initial pulse has a pulse width larger than the generated pulse width, by determining if a subsequent large pulse occurs within the remainder of the packet and by determining if more than ten pulses at bit cell locations 5-24 have a high binary data signal level.

BRIEF DESCRIPTION OF THE DRAWINGS

These and other objects, features and advantages of the invention will be more readily apparent from the following description of a preferred embodiment of the invention in which.

DETAILED DESCRIPTION OF THE PREFERRED EMBODIMENTS

Figure 1:
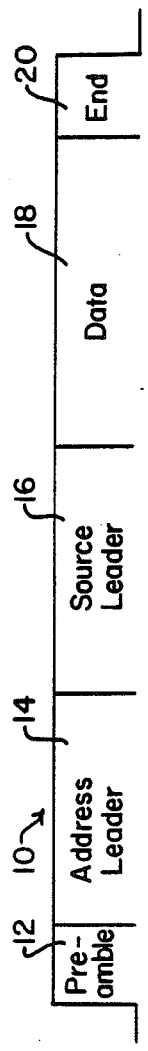
FIG. 1 is a signal waveform envelope illustrating a packet of data.

In FIG. 1, a bit stream chart is shown illustrating a typical data packet used in a packet switching system such as the Ethernet communications network. The packet, generally designated 10, comprises a preamble 12, an address leader 14, a source leader 16, a data bit series 18 and an end section 20. Preamble 12, address leader 14 and source leader 16 are collectively known as a header. Packet 10 begins with preamble 12 which is generally in the form of a single synchronization or mark bit, or alternatively a string of bits. Preamble 12 is followed by address leader 14 which is a series of bits that designates the destination of the packet. After address leader 14 is source leader 16 which is a series of bits that designates the source of the packet. Data bit series 18 follows source leader 16 and contains the substance of the communication of packet 10. Data bit series 18 may be followed by end section 20 which includes various error checks or information on linking of the packet with a succeeding packet.

Figure 2:
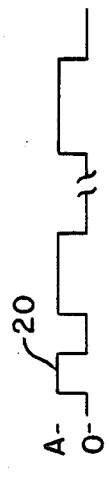
FIG. 2 is a graphical representation of a portion of a data signal packet used in the invention.

Typically, as shown in FIG. 2, each bit of the packet is transmitted in the form of a bit cell which is a phase encoded version of the binary data bit. For example, in "Bi-Phase L" encoding, there is a signal transition in each bit cell whose direction is the value of the data bit. Typically, a low to high transition represents a high bit state (or 1) and a high to low transition represents a low bit state (or 0). When optical fibers are used as the communications link, a high signal corresponds to the presence of optical energy in the fiber while a low signal corresponds to the absence of optical energy. Midway between successive signal transitions, it may be necessary to have a set up transition so that the next data transition is in the correct direction. In particular, a set up transition is needed whenever it is necessary to generate two successive bits having the same binary state. Further details concerning such encoding are set forth in U.S. Pat. No. 4,282,512 which is incorporated herein by reference.

In the method and apparatus of the present invention, a first portion of the preamble is encoded so that a collision between two packets can be detected under a variety of conditions while also ensuring that the receiver rapidly reaches equilibrium. In particular, a large pulse is substituted at the beginning of the preamble and the width of such pulse is set to a value larger than the width of a bit cell. In addition, a unique code is substituted for a section of the preamble, such code having a predetermined length with a predetermined number of bit cells having a binary value of one.

Preferably the width of the initial large pulse is set to an integral multiple of the width of a bit cell, for example 200 nsec. in the Ethernet system and is located at the first two bit cells of the preamble. The amplitude of the pulse must be sufficiently large to be detected and distinguished, even if attenuated.

Figure 3A:
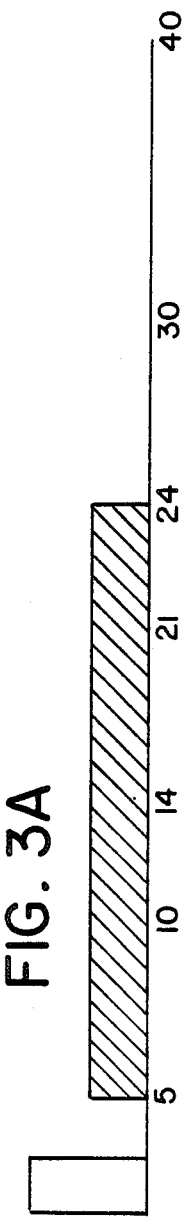
FIGS. 3a and 3b illustrate the location of the collision data in the preamble of the packet.
Figure 3B:
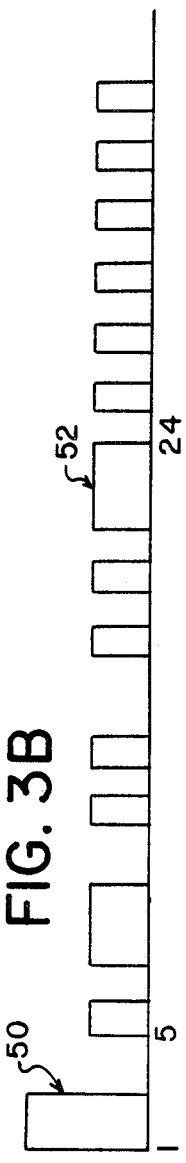

Preferably, the unique code is located at bit cells 5 to 24 (see FIG. 3a) and ten out of the twenty bits contain pulses having a high binary signal level. In other words, a twenty bit code is encoded in the preamble in which ten out of the twenty bits have a binary value of one. The pulse width is equal to the standard data pulse width, preferably 100 nsec for an Ethernet network, and the amplitude is likewise equal to the amplitude of a data pulse. Thus, as illustrated in FIG. 3b, the large pulse 50 is followed by, at bit cell locations 5 to 24, a code 52. The code generated for each packet should be different from any other packet transmitted at that time so if a collision occurs the number of pulses having a high binary signal level will be more than ten when the signals are summed together, as they are when signals collide. Preferably, the code is randomly generated so that each packet transmitted will most likely have a code different from that of any other packet transmitted at that time.

Using this information about the characteristics of the preamble, the collision of data packets can be detected with a high degree of accuracy. Upon receipt of a packet, the collision detection circuit first looks for the large initial pulse and measures the pulse width. If the pulse width is larger than the generated pulse width then a collision is assumed. For example, if the generated pulse width is 200 nsec. and the pulse width measured at the receiver is 300 nsec. then the detection circuitry reports that a collision has occurred. Preferably, to allow for signal noise that may occur, a collision is not reported unless the measured pulse width is greater than the generated pulse width plus 10% of the generated pulse width. Thus, in the case of the 100 nsec. Ethernet pulse width, a collision is detected if the measured pulse width is greater than 220 nsec.

The collision detection circuit also checks for the occurrence of a subsequent large pulse in the packet which also indicates that a collision has occurred.

If the large initial pulse is measured to be the proper pulse width, the collision detection circuit checks the bit cells containing the code and counts the number of pulses which have a high binary data signal level. If more pulses are counted then were originally generated, a collision is reported.

When an optical link is used to connect the transmitter and receivers, the binary data signal is generated over the optical transmission medium by a light emitting device such as a laser or a light emitting diode. The large initial pulse is produced by pulsing the light emitting device so that optical pulse is produced with an optical intensity greater than that associated with a high data bit.

Figure 4:
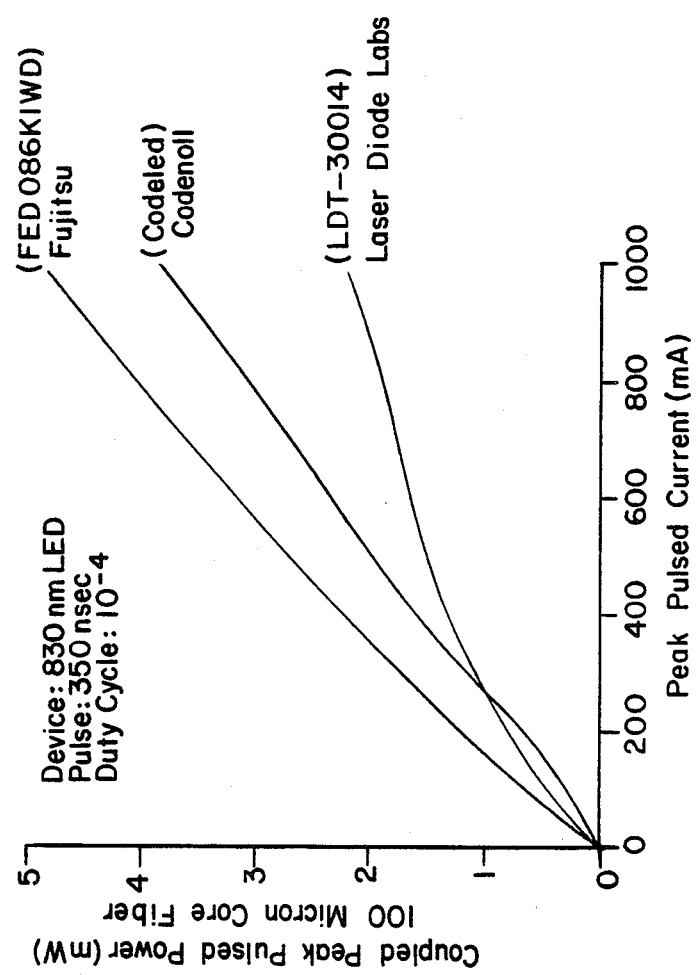
FIG. 4 is a graphical representation of the optical output of a light emitting diode as a function of input current which may be used in the invention.

FIG. 4 is a graphical representation of the optical intensity radiated by preferred light emitting device as a function of the electrical current input. In order to produce the desired optical impulses with amplitudes greater than a high data signal level, the light-emitting device must be able to generate a continuous range of optical intensities for a wide range of input current values without reaching a saturation value. Edgeemitting light emitting diodes having the characteristics presented in FIG. 4 are used since the optical power radiated does not saturate for the range of input current values used in the invention.

Figure 5:
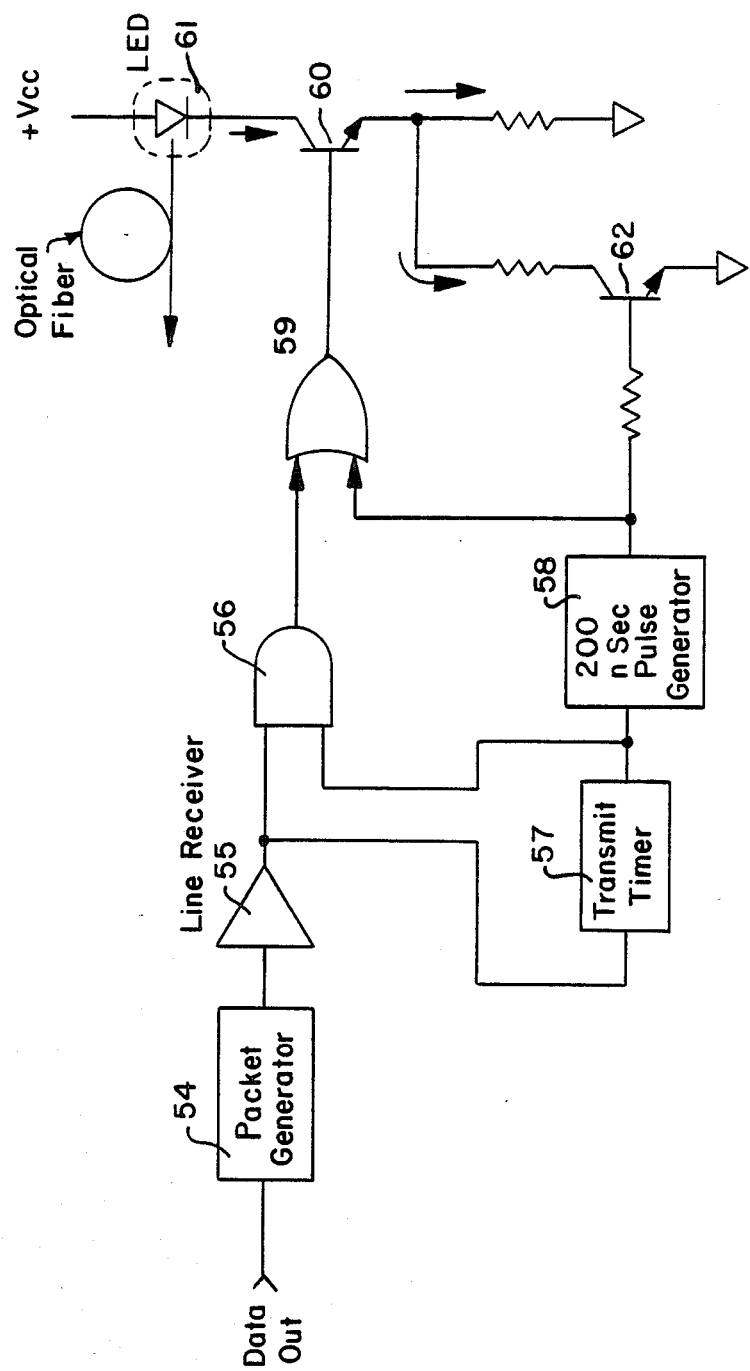
FIG. 5 is a block diagram showing a preferred embodiment of a transmitter used to generate the data signal packets of the invention.
Figure 6:
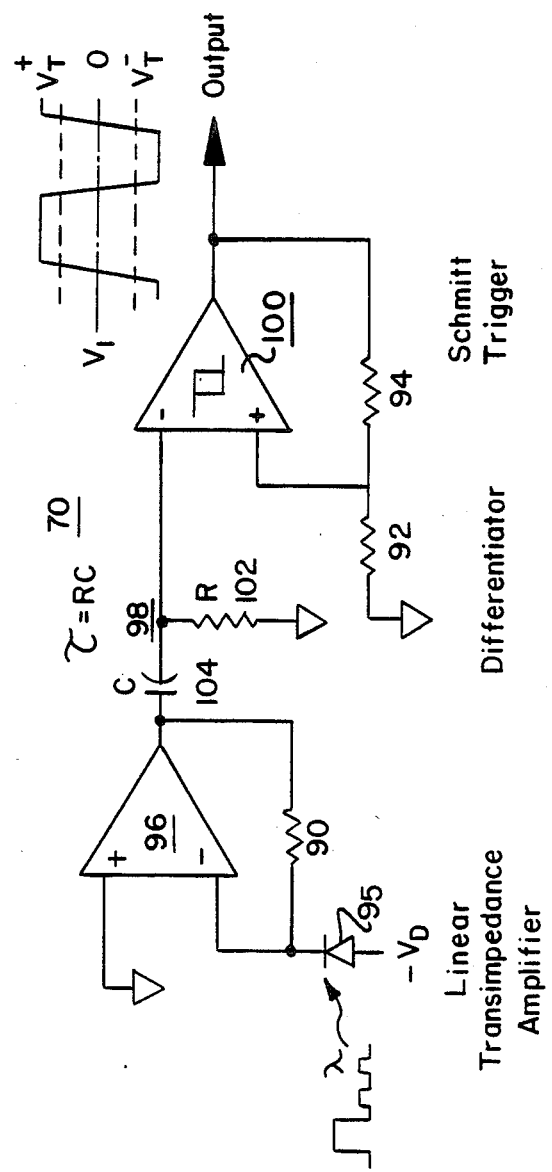
FIG. 6 is a block diagram showing a preferred embodiment of the photodetector used in the receiver depicted in FIG. 7.
Figure 7:
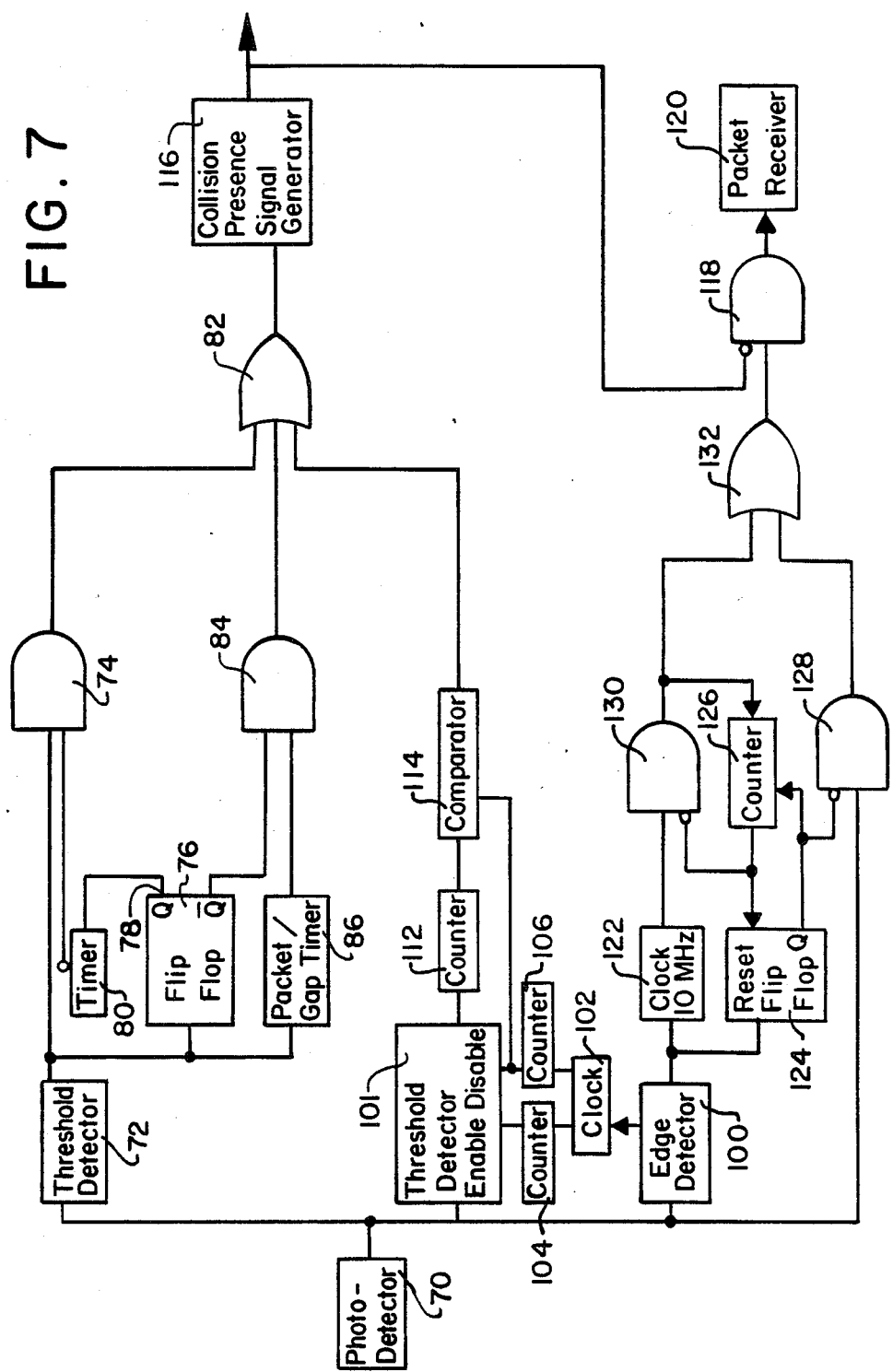
FIG. 7 is a block diagram showing a preferred embodiment of a receiver used to detect the collision of the data signal packets of the invention.

FIGS. 5, 6 and 7 are block diagrams illustrating preferred embodiments of the transmitter and receiver used to generate and detect the signal packet.

Referring to FIG. 5, the transmitter comprises a packet generator 54, line receiver 55, AND gate 56, timer 57, pulse generator 58, OR gate 59, transistors 60 and 62 and LED 61. The packet generator receives the data to be output in the packet and generates the packet of binary data bits having the format illustrated in FIG. 1 and the preamble, excluding the large initial pulse, depicted in FIG. 3. Thus the clock pulses are generated, followed by the random code along with the remainder of the information contained in the data packet which is output to line receiver 55, through AND gate 56, OR gate 59, transistor 60 to LED 61 which generates optical pulses corresponding to the packet information to be transmitted over the optical fiber. The initial pulse of the packet from line receiver 55 enable transmit timer 57 which outputs a high data signal to pulse generator 58 and AND gate 56 thereby enabling pulse generator 58 to output a 200 nsec. pulse and synchronizing the 200 nsec. pulse with the data from packet generator 54. When the input to AND gate 56 is high, the data from packet generator 54 is passed through to OR gate 59 which OR's the data with the 200 nsec. pulse generated by pulse generator 58 thus combining a 200 nsec. pulse with the data from the packet generator. The pulse generated by pulse generator 58 is also input to transistor 62 which causes an increase of input current to LED 61 thereby producing a higher power optical signal for a duration of 200 nsec. to generate the large initial pulse 50 referred to in FIG. 3.

Referring to FIG. 6, photodetector circuit 70 receives the output of an optical fiber (not shown) at photodiode 95 and converts the optical signal into an electrical signal using linear transimpedance amplifier 96, differentiator 98, and Schmitt trigger 100. The circuit has a time constant T equal to the value of resistor 102 multiplied by the value of capacitor 104. As discussed further below, this time constant is a parameter used to determine the minimum amplitude of the large initial pulse according to the following equation:

$$\frac{P_{HI}}{P_{LO}} \geq \frac{1.5}{\alpha(1 + e^{-t_2/T})}$$

where:

$P_{HI}$ is the amplitude value of the initial pulse;
$P_{LO}$ is the amplitude value of the data pulse;
$\alpha$ is the worst case ratio of the amplitude of two optical signals measured at a particular receiver signal;
$t_2$ is the data pulse width; and
T is the time constant of the differentiator circuit in the receiver As shown in FIG. 7, the output of photodetector 70 is connected via logic gates 128, 132 and 118 to packet receiver 120. The output of photodetector 70 is also connected to threshold detectors 72 and 101 and edge detector 100 which generate control signals for gates 118 and 128. Threshold detector 72 receives the output of photodetector 70 and determines if the output is greater than a threshold which is chosen to detect the large initial pulse. When the threshold of threshold detector 72 is exceeded, the threshold detector 72 generates a high signal level that is applied to AND gate 74, flip-flop 76 and packet/gap timer 86. Flip-flop 76 acts as a toggle switch. Its non-inverted output 78 is input to the enable input of the timer 80 and its inverted output is provided to a first input of AND gate 84. Initially, flip-flop 76 is in a reset state such that a high signal from threshold detector 72 sets the flip-flop causing the non-inverted output to change to a high output. This high output is input to timer 80 to start the timer 80 running. Timer 80 is set to run for a period equal to the pulse width of the generated initial pulse. Timer 80 outputs a high binary signal level when running and the output changes to a low binary signal level once the timer has timed out (i.e. run for the set time period). The output of timer 80 is inverted and input to the second input of AND gate 74. Thus, if timer 80 has timed out and the signal is still exceeding the threshold detector, the output of the AND gate 74 is a high signal level indicating that the pulse width of the large initial pulse has exceeded the pulse width of the transmitted pulse. This output is input to OR gate 82. Flip-flop 76 and timer 80 are reset at the end of each packet so the next packet can be tested.

The output of threshold detector 72 is also used to enable packet/gap timer 86, which runs for a period equal to the length of the packet plus the length of the minimum gap that should exist between packets. For example, for an Ethernet protocol the time period of timer 86 is 70 microseconds, 60 microseconds for the packet and 10 microseconds for the gap between packets. Similar to timer 80, packet/gap timer 86 outputs a high binary signal level while the timer is running and changes to a low binary signal level when the timer times out. The output of packet/gap timer 86 is input to the second input of AND gate 84.

As indicated above, the inverted output of flip-flop 76 is input to a first input of AND gate 84. This output is low and AND gate 84 is disabled while the flip-flop is in the set state. If, however, the signal from photodetector 70 goes below the threshold and subsequently rises above the threshold of threshold detector 72, a second high signal level will be generated by detector 72 which will toggle flip-flop 76 causing it to enter the reset state. In the reset state, the inverted output of flip-flop 76 is high and AND gate 84 is enabled. As a result, if timer 86 is still running when AND gate 84 is enabled, the output of AND gate 84 will be a high binary signal level indicating that more than one large pulse has occurred within the period equal to the duration of the packet and the gap between packets.

The output of photodetector 70 is also input to edge detector 100 which detects the leading edge of the first pulse of the packet. Once the initial leading edge of the packet is detected by edge detector 100, the edge detector provides a high binary data signal to the enable line of clock 102. This causes clocking signals to be output in binary data signal form to counters 104 and 106. The clock signals have the same timing as the data stream in the received signal. Counter 104 outputs a high signal level after four clock pulses, equivalent to four bit cells, are counted and counter 106 outputs a high signal level after twenty-four clock pulses are counted. The output of counter 104 is input to the enable line of threshold detector 101 and the output of counter 106 is input to the disable line of threshold detector 101. The output of counter 106 is also applied to comparator 114 to initiate a comparison after twenty-four clock pulses have been counted. Thus after the clock has counted four bit cells, the threshold detector is enabled and when the clock has counted twenty-four bit cells the threshold detector is disabled.

The threshold detector 101 detects high data signal levels and produces an output pulse for each such signal level detected. The number of data signals detected is counted by pulse counter 112. When twenty-four clock pulses have been counted and the output of counter 106 becomes a high data signal level, the comparator 114 is enabled and the count contained in counter 112 is compared to a preset comparison value. This value is the number of high signals that should be present in this portion of a message packet when no collision has occurred, for example ten. If the preset value is not equal to the value counted by counter 112, a high data signal is output from the comparator 114. This signal is input to OR gate 82 signifying that a collision has occurred.

Therefore, if any of AND gate 74, AND gate 84 and comparator 114 output a high data signal level, the output of OR gate 82 will also be at a high data signal level indicating that a collision has occurred.

The output of the OR gate is input to collision presence signal generator 116 which generates a signal that is applied to the transmitter portion of the circuitry to indicate that it is necessary to retransmit the packet being sent. This signal is also used to reset the threshold detection circuitry of FIG. 7. If the output of the OR gate 82 is at a low data signal level, no packet collisions have occurred and the collision presence signal generator is inactive.

In addition, the output of OR gate 82 and signal generator 116 is inverted and input to AND gate 118 to control the flow of the received signal from photodetector 70 to the packet receiver 120 so that the received signal is input to packet receiver 120 only when no packet collisions have occurred. In addition, since some clocking information may be lost in the collision detection process, the collision detection data is stripped from the beginning of the preamble and replaced with signals equivalent to the clock pulse typically found in the preamble of the packet.

To do this, the output of photodetector 70 is input to edge detector 100 which detects the leading edge of the first pulse. The output of edge detector 100 is input to clock 122 and flip-flop 124. Clock 122 produces clock signals having the same timing as the data stream in the received signal, e.g., 10 MHz clock signals in the case of a system following the Ethernet protocol. The signal from edge detector 100 enables the clock which generates the preamble clock pulses to be inserted into the preamble at bit cell locations 1–24. Upon receipt of a high signal level from edge detector 100, flip-flop 124 outputs a high signal level to the enable line of counter 126 and to the inverted input of AND gate 128, thereby disabling gate 128 and stripping the preamble from the received signal. Initially the output of counter 126 is a low signal which is inverted at an input to AND gate 130 so as to enable that gate. As a result clock signals from clock 122 are applied via AND gate 130, and OR gate 132 to AND gate 118 and packet receiver 120 in place of the preamble. Once counter 126 is enabled, it counts up clock pulses from AND gate 130 to a preset value, indicative of the length of the collision data, in this example twenty-four, and generates a high signal level when that preset value is reached. The high signal level resets flip-flop 124 causing the non-inverting output to go low, thereby enabling gate 128. The high signal from counter 126 is also inverted and input to AND gate 130, thereby disabling that gate. As a result, the output of clock 122 is now blocked at gate 130 and the output of photodetector 70, which is the packet signal, is provided via AND gate 128 and OR gate 132, to AND gate 118 and packet receiver 120.

While the invention has been described in conjunction with specific embodiments, it is evident that there are numerous variations in the invention which will be apparent to those skilled in the art in light of the foregoing description. While the use of a randomly generated ten-out-of-twenty code at bit cells 5 through 24 of the preamble has been described, it will be apparent that other codes, other generation schemes and other bit locations may be used. In some applications it may also be advantageous to combine the code of the preamble with the source leader information since each source ordinarily has a unique address and provide both the code and the source leader information as a unique block of bits in the preamble. By way of a specific example, each source can be identified by a unique ten-out-of-twenty code and that code can be transmitted at bit locations five through twentyfour of the preamble and used both to detect collisions and identify the source of the packet.

We claim:

1. In a communication network, a method for detecting collisions of varying overlap among packets of binary data transmitted over said network comprising:
   (a) generating in each binary data signal packet that is transmitted over the network a collision signal comprising:
      (i) a large initial pulse having an amplitude greater than that of a high binary data signal level and a pulse width greater than the pulse width of a binary data signal; and
      (ii) a unique first code comprising a first predetermined number of data signals in which a second predetermined number of the data signals have a first data signal level;

(b) monitoring said network continuously while data packets are being transmitted to detect collisions between data signal packets transmitted from different transmitters;

(c) producing a first error signal if a collision signal detected comprises a large pulse having a pulse width greater than the pulse width of the generated initial pulse;

(d) producing a second error signal if a collision signal detected includes a first code having a number of data signal with a first data signal level that is different from the second predetermined number of data signals having said first data signal level; and (e) producing a third error signal if a second large pulse is detected within a time period equal to the length of the packet and the length of a gap between successive packets being transmitted;

wherein collisions of packets of binary data are detected if any one or any combination of said first, second and third error signals are produced.

2. The method of claim 1 wherein the large initial pulse generated has an amplitude sufficiently large to be detected after attenuation of the pulse.

3. The method of claim 1 wherein the large pulse is generated at the beginning of the packet.

4. The method of claim 1 wherein the predetermined number of data signals in the binary code is equal to twenty and the number of data signals which have said first binary data signal level is equal to ten.

5. The method of claim 1 wherein the unique first code is a randomly generated code.

6. In a communication network, and apparatus for detecting collisions of packets of binary data transmitted over said network comprising:

means for generating in the binary data packets that are transmitted over the network a collision signal comprising:

a large initial pulse having an amplitude greater than that of a first binary data signal level and a pulse width greater than the pulse width of a binary data signal; and a unique first code comprising a first predetermined number of data signals in which a second predetermined number of data signals have a first data signal level;

means for transmitting said data signal packets having said collision signal;

means for receiving said data signal packets from said transmitting means;

means for monitoring said network continuously while data packets are being tranmsitted to detect collisions between data signal packets transmitted from different transmitters;

means for producing a packet collision signal if one or any combination of the following is detected by said monitoring means:

a collision signal comprising a large initial pulse having a pulse width greater than the pulse width of the generated initial pulse; or a collision signal comprising a first code comprising a number of data signals having a first data signal level that is different from the second predetermined number of data signals having said first data signal level; or a subsequent large pulse within a time period equal to the length of the packet and the length of a gap between successive packets being transmitted.

7. The apparatus of claim 6 wherein:

said transmitting means comprises an optical signal transmitting means connected to said generating means which converts said output of said generating means into a modulated optical signal and transmits said modulated optical signal over an optical transmission medium; and said receiving means comprises an optical receiving means which receives said modulated optical signal from said optical transmission medium and converts said modulated optical signal into a modulated electrical signal that is applied to said means for receiving said binary data signal packets.

8. The apparatus of claim 7 wherein the optical signal transmitting means is an edge-emitting light diode.

9. The apparatus of claim 6 wherein the means for generating a unique first code comprises a means for generating a random code.

* * * * *